United States Patent [19]

Füssl

[11] Patent Number: 4,480,991
[45] Date of Patent: Nov. 6, 1984

[54] PROCESS OF AND APPARATUS FOR OPERATING A SHAFT FURNACE

[75] Inventor: Erwin Füssl, Zürich, Switzerland

[73] Assignee: Maerz Ofenbau AG, Zürich, Switzerland

[21] Appl. No.: 450,746

[22] Filed: Dec. 17, 1982

[30] Foreign Application Priority Data

Dec. 23, 1981 [CH] Switzerland .................... 8267/81

[51] Int. Cl.³ .................. F27B 15/00; F23Q 9/00; F27D 7/00; F27B 3/20
[52] U.S. Cl. .................................. 432/14; 266/197; 431/162; 431/284; 432/25; 432/94; 432/96
[58] Field of Search .................. 432/14, 25, 94, 96, 432/102; 266/197; 431/162, 284

[56] References Cited

U.S. PATENT DOCUMENTS

| 3,771,946 | 11/1973 | Hofer et al. | 432/14 |
| 4,289,482 | 9/1981 | Fussl | 432/96 |
| 4,414,186 | 11/1983 | Schmidt et al. | 432/96 |

FOREIGN PATENT DOCUMENTS

| 403495 | 10/1924 | Fed. Rep. of Germany . | |
| 1151266 | 7/1963 | Fed. Rep. of Germany . | |
| 1157133 | 11/1963 | Fed. Rep. of Germany . | |
| 2852249 | 4/1980 | Fed. Rep. of Germany . | |
| 2927851 | 9/1980 | Fed. Rep. of Germany . | |
| 1282186 | 12/1961 | France | 432/96 |
| 2450241 | 8/1979 | France . | |

OTHER PUBLICATIONS

ZEMENT-KALK-GIPS, Band 35, Nr. 6, Jun. 1982, pp. 290-300 Wiesbaden-Biebrich, DE., Erwin Fussl et al.

*Primary Examiner*—John J. Camby
*Attorney, Agent, or Firm*—Toren, McGeady and Stanger

[57] ABSTRACT

In a shaft furnace for burning limestone or similar raw materials, gaseous, liquid or solid fuels are supplied through fuel supply pipes to the burning zone of a furnace shaft. To permit the simultaneous supply of at least two different fuels, the fuel supply pipes are arranged as multiple fuel lances. The fuel lances extend inwardly from the shaft furnace wall through the preheating zone into the first part of the burning zone. The fuel lance is a double tube member made up of an inner tube laterally enclosed by an outer tube forming an inner fuel supply passageway and an outer annular fuel supply passageway. Two separate fuels can be introduced into the burning zone, one flowing through the inner passageway and the other through the outer annular passageway. The two different fuels can be supplied in varying proportions without any changeover operations.

10 Claims, 2 Drawing Figures

PROCESS OF AND APPARATUS FOR OPERATING A SHAFT FURNACE

SUMMARY OF THE INVENTION

The present invention is directed to a process of and apparatus for operating a shaft furnace for burning limestone and other raw mineral material. Gaseous, liquid or solid fuels are introduced to the burning zone of the furnace shaft through fuel supply pipes and the fuel supply pipes are constructed as multiple fuel lances.

With the continuously changing situation in the fuel market with respect to the availability and cost of gaseous, liquid and solid fuels, it is necessary for many consumers to install plants capable of using different fuels. Frequently, it is a requirement that a minimum delivery of a particular fuel is necessary.

In the case of uniflow-regenerative shaft furnaces, for burning limestone and similar raw mineral materials, in which two or more shafts are connected by a connecting duct with one shaft operated as a burning or uniflow shaft and the other shaft or shafts functioning as removal or counterflow shaft or shafts, it is known to supply a fuel, in gaseous, liquid or solid form, through fuel pipes into the burning zone of the burning shaft in the shaft furnace. The fuel pipes are arranged in the packed bed and are distributed over the cross-section of the furnace shaft so that a uniform fuel supply is introduced into the burning zone.

It has been known to heat shaft furnaces of the above mentioned type alternately with one or another fuel. Considerable problems occur in such an arrangement, however, during changeover, even if the same fuel pipes are used. Accordingly, when a large number of fuel supply pipes are located in each shaft, such a changeover represents a time-consuming operation, requiring the furnace installation to be shut down for several hours.

Therefore, the primary object of the present invention is to provide a process of and apparatus for operating a shaft furnace using gaseous, liquid or solid fuels, as a function of the particular circumstances, without requiring any considerable amount of time for the particular changeover operation.

In accordance with the present invention, two separate fuels, whose proportions may vary, are supplied through two or more fuel supply pipes located in a furnace shaft with each supply pipe arranged for introducing a separate fuel into the burning zone in the furnace shaft. Appropriately, the fuel supply pipes are constructed as double pipes, that is, where one pipe is concentrically located around another pipe in a telescoped arrangement.

The various features of novelty which characterize the invention are pointed out with particularity in the claims annexed to and forming a part of this disclosure. For a better understanding of the invention, its operating advantanges and specific objects attained by its use, reference should be made to the accompanying drawings and descriptive matter in which there are illustrated and described preferred embodiments of the invention.

DETAIL DESCRIPTION OF THE INVENTION

Figure 1:
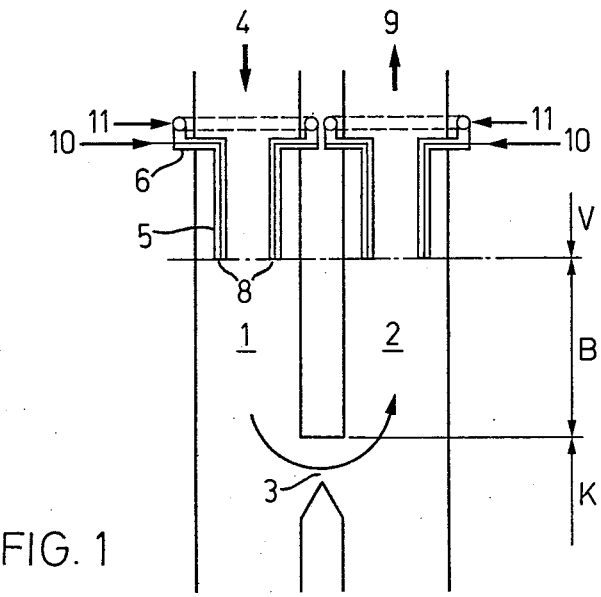
FIG. 1 is a schematic view of a vertical section through a uniflow-regenerative shaft furnace formed of two shafts shown in a very simplified manner.

In the schematic showing of the shaft furnace illustrated in FIG. 1, two shafts 1, 2 are each subdivided into a preheating zone V, a burning zone B and a cooling zone K. At the lower end of the burning zone B, the shafts are interconnected by a transfer duct 3. As illustrated in FIG. 1, shaft 1 is used as a uniflow or burning shaft with the entry of combustion air shown by an arrow 4. The air is introduced into the shaft 1 from above in a manner not shown.

Each of the shafts 1, 2 contains two fuel pipes 6 each constructed as a fuel lance 5. Each lance extends through the preheating zone V with its outlet opening 8 located at the entry into or in the first part of the burning zone B. Fuel pipes 6 are constructed for supplying at least two different fuels, as will be explained relative to FIG. 2. The introduction of the two different fuels is displayed by arrows 10, 11.

In FIG. 1 the shaft 2 functions as a counterflow or removal shaft, the flue gases flowing through the transfer duct 3 flow upwardly through the shaft 2 and exit from its upper end as illustrated by arrow 9. At the end of a burning cycle, the functions of shafts 1, 2 are reversed with shaft 2 acting as the uniflow or burning shaft into which the fuels 10, 11 are supplied. No fuel is supplied to the counterflow or removal shaft, rather one of the tubes of the fuel pipes 6 form a passageway for introducing a purge or scavenging medium for preventing the penetration of dust-containing flue gases into the interior of the fuel supply pipe 6.

Figure 2:
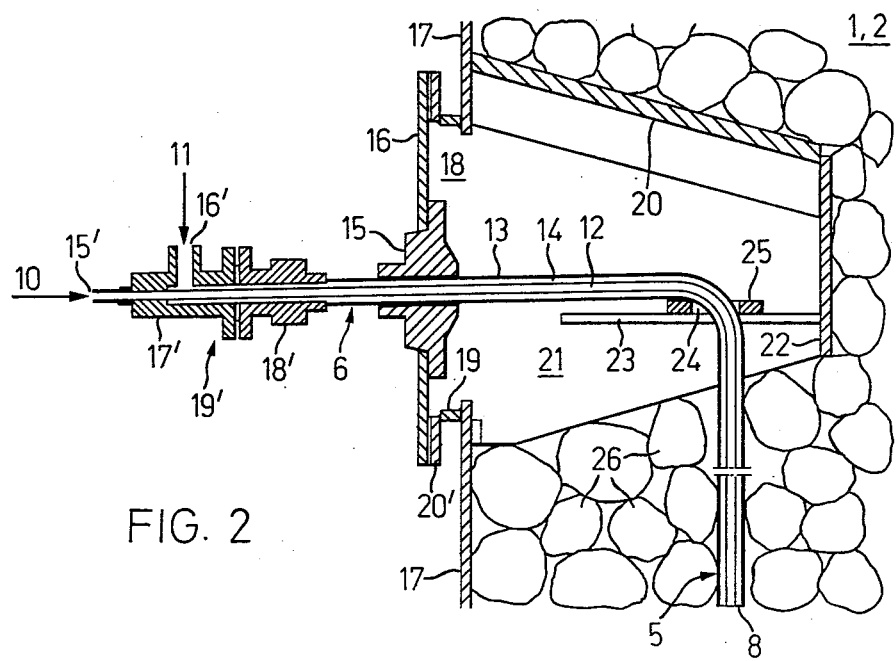
FIG. 2 is a vertical sectional view of a diagrammatically represented fuel lance fixed to the wall of a furnace shaft and supplying two different fuels.

As shown in FIG. 2, the fuel supply pipe 6 is constructed as a fuel lance 5 and can be used for supplying two different fuels in separated form into the shaft furnace. Fuel supply pipe 6 is made up of a central fuel pipe 12 and a jacket fuel pipe 13 laterally enclosing the central pipe and spaced radially outwardly from it. In this arrangement, two ducts or passageways are formed, a central passageway is formed by the central fuel pipe 12 and an annular passageway 14 is formed between the inside of the jacket fuel pipe 13 and the outside of the central fuel pipe 12. Both ducts or passageways are separate from one another over the axial length of the fuel pipe 6 and the outlet opening 8 of each is located at the entry plane into the burning zone B. Two pipe connections 15', 16' are provided in each of the fuel pipes 6 for the separate introduction of the different fuels into the passageway in the central pipe 12 and the annular passageway 14 around the central pipe. Fuel is introduced in the direction of arrow 10 into the central pipe 12 and in the direction of the arrow 11 into the annular passageway 14. Pipe connections 15', 16' form part of a connecting piece 19'. The connecting piece 19' is made up of two parts 17', 18' with part 18', fixed at one end to the inlet end of the jacket pipe 13 and at its other end to the part 17'. The two pipe connections 15', 16' are located in the part 17'. In this way separate sources of fuel are introduced into the central fuel pipe 12 and into the annular passageway 14 within the jacket pipe 13.

The connecting piece 19' is located exteriorly of the shaft 1, 2. The inlet end of the supply pipe 6 extends from the connecting piece 19' through a retaining head 15 into the furnace shaft 1, 2. Retaining head 15 is fixed to a fastening plate 16 which in turn forms a cover over an opening 18 in the wall 17 of one of the shafts 1, 2. A connection 19 including a flange 20' extends between and secures the fastening plate 16 to the wall 17.

Within the shaft, a roof-like cover is attached to the interior of shaft wall 17. The roof-like member includes a sloping roof member 20, with side walls 21 and an end wall 22 depending downwardly from the member 20. A fork-like support 23 is fixed to the side walls 21 and has a fork opening directed toward the fastening plate 16. A bracket plate 25 is supported on the fork-like support 23. Bracket plate 25 has an opening 24 through which the fuel supply pipe passes and the bracket plate is fixed to the fuel supply pipe, such as by welding. This arrangement makes it possible to dismantle and/or replace the fuel supply pipe 6 after the packed bed of material 26 to be burned has dropped to the level of the lance opening 8, and the fastening plate 16 has been released from the shaft wall 17.

In supplying the two fuels, one fuel is introduced through the annular passageway 14 and the other flows through the central pipe 12. The two fuels are maintained separate as they flow through the fuel pipe 6 until they exit from the outlet opening 8. If the two fuels are coal dust and a fuel gas, such as natural gas, the gas is passed through the annular passageway 14 and the coal dust is directed through the central fuel pipe 12. If the fuels are oil and a fuel gas, the oil is introduced through the central fuel pipe 12 and the fuel gas passes through the annular passageway 14. If the fuels are oil and coal dust, the coal dust is supplied through the annular passageway 14 with the oil introduced through the central fuel pipe 12. Advantageously, the oil is always introduced through the central fuel pipe, otherwise there would be the risk of oil cracking.

In accordance with the invention, it is also possible to construct the fuel supply pipe 6 with more than two pipes and though a concentric arrangement of the pipes is advantageous, it is not necessary. As a result of the fuel supply pipe 6 according to the invention, it is possible to simplify the operation of a shaft furnace, if the burning operations are carried out using different fuels. The purge medium introduced into the counterflow shaft can be supplied through both the passageway formed by the central fuel pipe 12 and the annular passageway 14 within the outer jacket pipe 13.

Fuel supply 6, in the form of a multiple fuel lance 5, permits simultaneous operation using two different fuels in varying proportions. It would be possible, to operate using a single gaseous, liquid or solid fuel. If the supply of one of the fuels is completely stopped, a purge medium, such as air or an inert gas, can be supplied through the corresponding fuel passageway.

While specific embodiments of the invention have been shown and described in detail to illustrate the application of the inventive principles, it will be understood that the invention may be embodied otherwise without departing from such principles.

I claim:

1. A process of operating shaft furnaces for burning limestone and similar raw mineral materials with the shaft in the furnace having a preheating zone followed by a burning zone, using gaseous, liquid or solid fuels as the fuel in the burning zone, conducting the fuel in a closed passageway through the preheating zone and introducing the fuel into the burning zone at the transition from the preheating zone to the burning zone, introducing fuel into the burning zone in at least two separate locations, supplying at least two separate fuels to each of the separate locations, introducing the separate fuels into the burning zone from separate outlets in a common plane at each location, forming double passageways each for the flow of a separate one of the fuels through the preheating zone into the burning zone, and arranging the double passageways one within the other for providing a central passageway and an annular passageway laterally encircling the central passageway.

2. A process, as set forth in claim 1, including the steps of using a gaseous fuel and a solid fuel and flowing the gaseous fuel through the annular passageway and flowing the solid fuel through the central passageway.

3. A process, as set forth in claim 1, including the steps of using a liquid fuel and a gaseous fuel and introducing the gaseous fuel through the annular passageway and introducing the liquid fuel through the central passageway.

4. A process, as set forth in claim 1, including the step of using a liquid fuel and a solid fuel and flowing the liquid fuel through the central passageway and flowing the solid fuel through the annular passageway.

5. A shaft furnace for burning limestone and similar raw mineral materials using gaseous, liquid or solid fuels, comprising wall means forming a shaft, said wall means comprising a furnace wall, an elongated multiple fuel lance extending from the exterior through said furnace wall into said shaft, said fuel lance supported on said furnace wall, means supporting said fuel lance within said shaft, said multiple fuel lance having an outlet end located within said shaft, and means in said fuel lance forming separate fuel passageways extending therethrough in the elongated direction of said fuel lance and each opening from the outlet end of said fuel lance in a common plane.

6. A shaft furnace, as set forth in claim 5, wherein said furnace wall has an opening therethrough, a fastening plate covering the opening in said furnace wall, a retaining head secured in said fastening plate and having an opening therethrough with said fuel lance extending through said opening and supporting said retaining head, and said means within said shaft comprising a cover secured to and extending inwardly from said furnace wall and extending over said fuel lance projecting inwardly from said retaining head into said shaft.

7. A shaft furnace, as set forth in claim 6, wherein said means includes a fork-shaped support member secured to said cover and forming an opening directed toward said fastening plate, a support bracket mounted on said support plate, said bracket plate having an opening therethrough through which said fuel lance extends and said fuel lance secured to said bracket plate.

8. A shaft furnace, as set forth in claim 7, wherein said separate fuel passageways comprise a central passageway and an annular passageway laterally enclosing said central passageway, the inlet end of said fuel lance is located exteriorly of said furnace wall and means secured on the inlet end of said fuel lance for providing separate inlet openings into the central passageway and the annular passageway through said fuel lance.

9. A shaft furnace, as set forth in claim 8, wherein at least a pair of said fuel lances are located within said shaft and the outlet ends of said lances are located in a common plane extending transversely of their axes.

10. A shaft furnace, as set forth in claim 9, wherein said wall means forms a pair of shafts disposed in separated relation, said shafts having an upper end and a lower end, each said shaft having a preheating zone in the upper end thereof, a burning zone located below and extending downwardly from the preheating zone, and a cooling zone extending downwardly from the lower end of the burning zone, and an interconnecting duct located at the lower end of the burning zones for interconnecting said shafts.

* * * * *